United States Patent Office 3,028,542
Patented Apr. 3, 1962

3,028,542
WELL LOGGING APPARATUS
Melvin C. Terry, Houston, Tex., assignor, by mesne assignments, to Jersey Production Research Company, Tulsa, Okla., a corporation of Delaware
Filed Sept. 3, 1959, Ser. No. 837,878
4 Claims. (Cl. 324—10)

This is a continuation-in-part of copending application Serial No. 730,638 for "Well Logging Method and Apparatus," filed April 24, 1958, by Melvin C. Terry, and now abandoned.

This invention relates to the electrical logging of boreholes with reverse wetting surfactants, and more particularly to improve apparatus for injecting reverse wetting surfactants behind the filter cake that lines the walls of the borehole, and for measuring changes in electrical resistivity produced by the injection.

In U.S. Patent No. 2,873,423—J. W. Graham et al., there is described a method of logging a borehole wherein earth formations are contacted with a reverse wetting surfactant consisting of a cationic salt. Measurements are made of the change in the resistivity of the earth formations brought about by the action of the surfactant. The surfactant alters the capillary forces within the earth formation so that the formation becomes preferentially oil wet. The resulting formation resistivity change in the vicinity of the borehole is very pronounced when the formation contains hydrocarbons such as petroleum, and provides a positive indication of formations capable of producing hydrocarbons.

The present invention provides a housing on which is mounted an electrically conductive open-ended caisson adapted to be pressed against the side of a borehole. A sealing pad around the open end of the caisson serves to isolate the interior of the caisson from borehole fluids. A pump means hydraulically coupled to the interior of the caisson pumps fluids from within the caisson to reduce the pressure therein below the pressures of the fluids in the borehole and in the surrounding earth formations. Earth formation fluids flowing into the caisson are effective in disrupting the filter cake to expose the surface of the formation. Included with the housing and individually hydraulically coupled to the interior of the caisson are reservoirs for reverse wetting surfactant and for a normalizing fluid for bringing the earth formation to a standard resistivity. After the filter cake has been disrupted, as described above, a resistivity measurement is made. The normalizing fluid is then injected into the filter cake to contact the earth formation and another resistivity measurement is made. If the two resistivity measurements do not differ, the surfactant is injected and another resistivity measurement is made. If the resistivity measurements do differ appreciably, normalizing fluid is repetitively injected until measurements after two successive injections indicate substantially the same resistivity, after which the surfactant is injected into the formation. This procedure insures that any changes in resistivity after injection of the surfactant are caused by action of the surfactant and not by resistivity of the formation fluid.

For the purpose of measuring the resistivity brought about by successively injecting the normalizing fluid and the surfactant through the caisson to contact the exposed earth formations, there is provided a resistivity measuring apparatus comprising an electrode carrier or holder of non-conductive material that projects through the caisson opposite the open end thereof so as to contact the exposed formations substantially at the center of the open end. A metallic electrode is affixed to the open end of the electrode carrier within the caisson to contact the earth formations. Electrical connections from the caisson and from the electrode through the electrode carrier are connected to a suitable resistivity measuring apparatus, such as a Wheatstone bridge, to measure electrical resistivity between the electrode and the caisson through the earth formations contacted thereby. A weak spring outside of the caisson is provided to normally retract the electrode holder into the caisson away from the earth formations. The differential pressure produced by the pump is sufficient to overcome the force of the spring to draw the holder through the caisson until the electrode contacts the earth formation.

The invention will be described in detail with reference to the accompanying drawing, wherein:

FIG. 3 is a detailed view of a portion of the apparatus of FIG. 2, partially in cross-section, showing the apparatus in its operative position for conducting a resistivity measurement.

Figure 1:
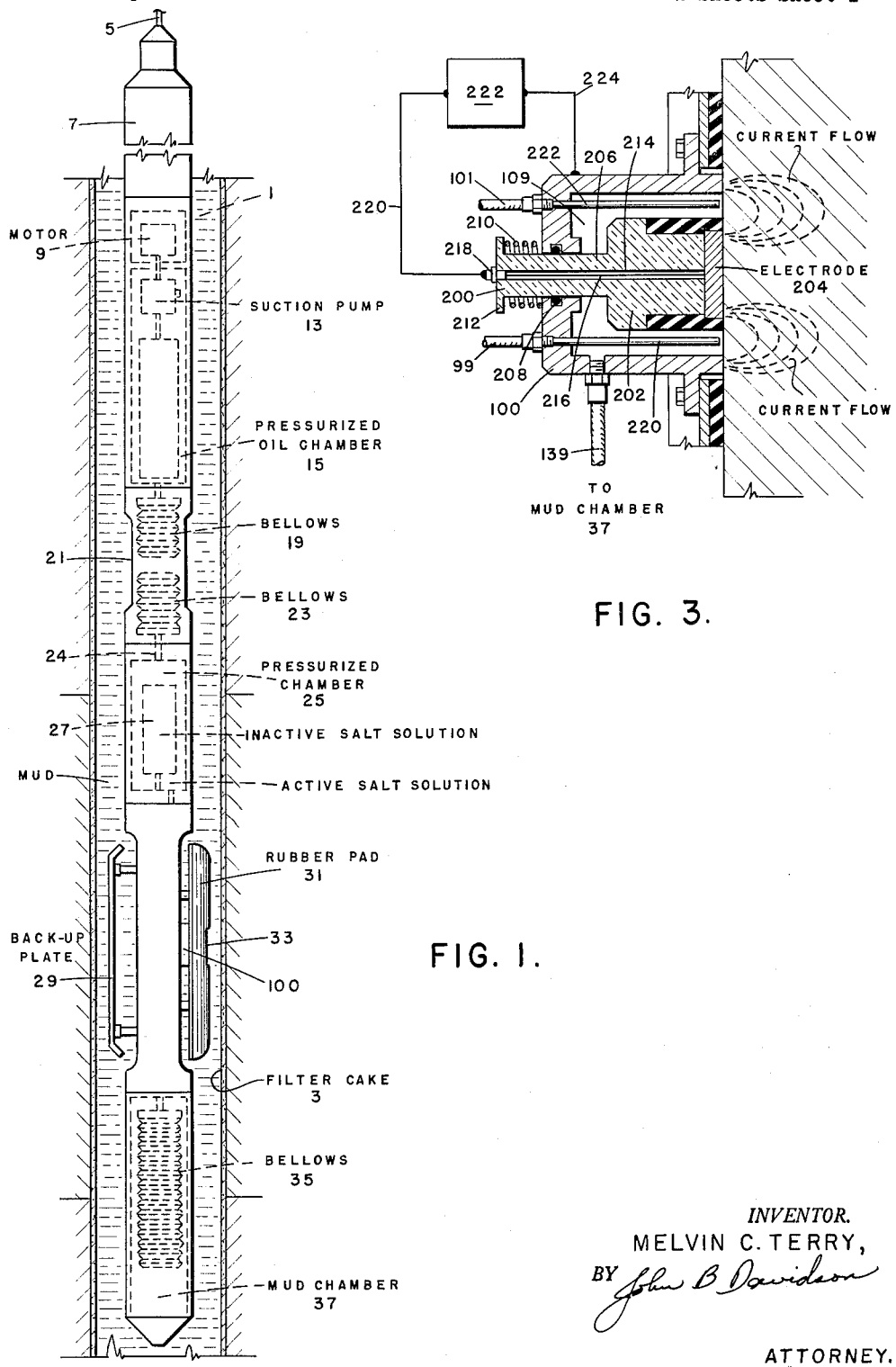
FIG. 1 is a view of an embodiment of the invention positioned within a borehole.

In FIG. 1 there is shown an instrument housing 7 that is suspended from a logging cable 5 within a borehole 1. The borehole is lined with a filter cake 3 deposited on the walls thereof during drilling operations. The interior of the instrument housing 7 is open to borehole pressure (i.e., the pressure exerted by the drilling fluid in the vicinity of the housing) through openings 21. The instrument housing may be an elongated cylinder constructed according to known techniques for logging sondes. The instrument housing carries a deformable pad or shoe 31 of rubber or rubber-like material having a central opening 33. The pad surrounds the open end of a caisson or rigid-walled caisson 100. Preferably, caisson 100 is cylindrical. When the pad is rammed against the surface of filter cake 3 it is adapted to isolate a section of the surface of the filter cake defined by the opening 33. The function of pad 31 is to provide a fluid seal between the edge of the opening 33 and filter cake 3 so as to prevent entry of borehole fluids into the caisson when the pad is rammed against the filter cake. The pad is hydraulically rammed against the filter cake by apparatus including back-up plate 29. The pad 31, back-up plate 29, and certain of the associated apparatus are substantially the same as the apparatus described by M. Lebourge et al. in Paper No. 701–G, presented at the fall 1956 meeting of the American Institute of Mining and Metallurgical Engineers in Los Angeles, California. Extending through the wall (FIG. 3) of caisson 100 opposite the open end of the caisson is an electrode carrier 200 which may be formed of a nonconductive material, most suitably a plastic material. The enlarged head 202 of carrier 200 carries a metallic electrode 204 which is adapted to extend through the open end of the caisson substantially through the center thereof to contact earth formations adjacent the caisson. The reduced center portion 206 of the electrode carrier is adapted to slide through an opening in the caisson. An O-ring 208 provides a seal between the interior and the exterior of the caisson so that the electrode carrier 200 may slide back and forth without equalizing differential pressure across the caisson wall. A weak coil spring 210 engages the enlarged portion 212 of electrode carrier 200 and the caisson to retract the electrode 204 away from the earth formations when there is no differential pressure between the interior and exterior of the caisson. An axial bore 214 is drilled through the electrode carrier 200 so that an electrical lead 216 may connect electrode 204 with electrical connector 218. A suitable electrical resistivity measuring device, such as a Wheatstone bridge, may be provided at the earth's surface for measuring the resistivity between electrode 204 and caisson 100. The Wheatstone bridge 222 is connected to caisson 100 by electrical lead 224, and to electrical connector 218 by electrical lead 220.

Figure 2:
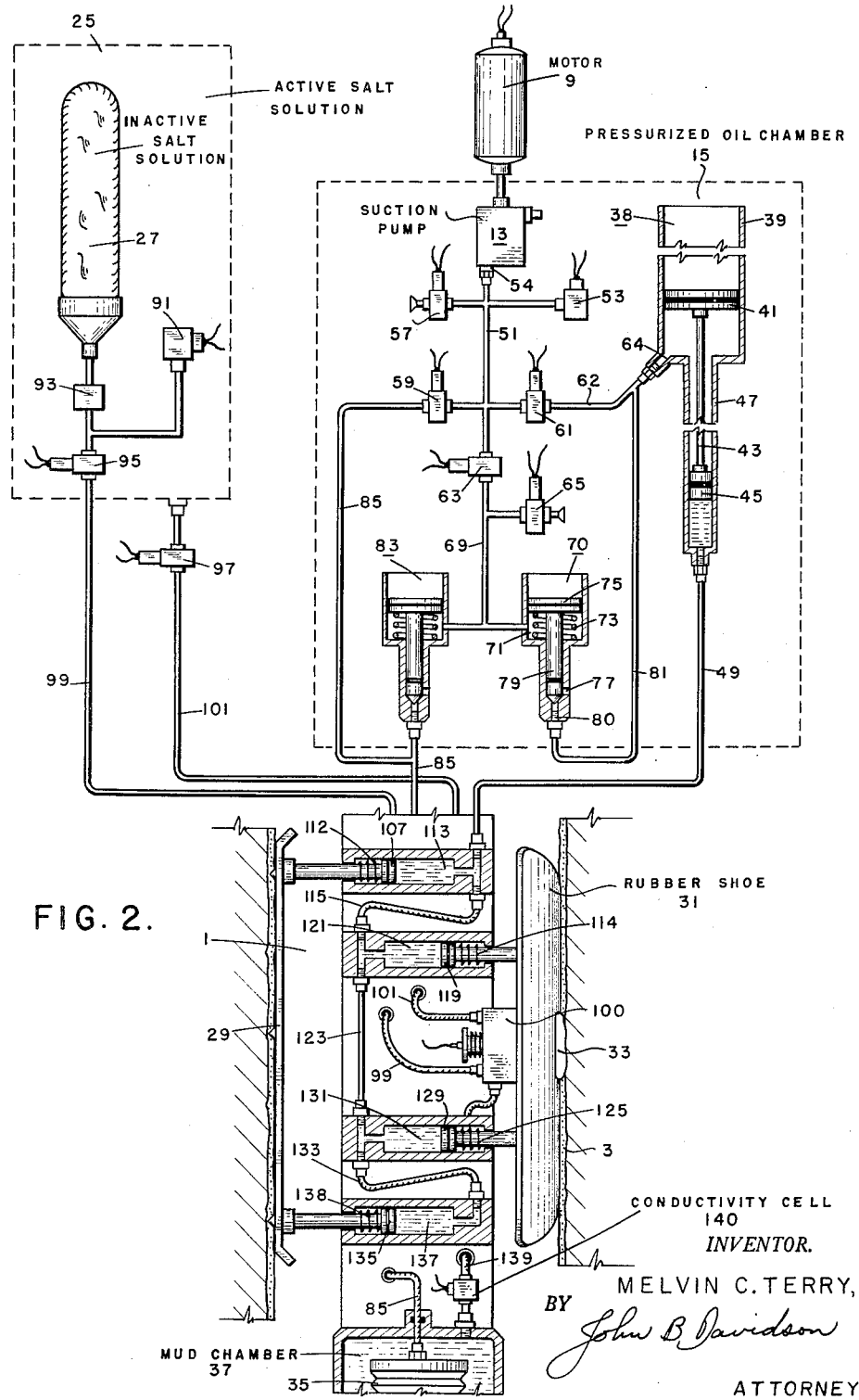
FIG. 2 is a detailed view of portions of the apparatus of FIG. 1 showing the hydraulic connection therebetween.

As shown most perspicuously in FIG. 1, a pair of flexible fluid reservoirs 25 and 27 are provided within which are stored a solution of a reverse wetting surface-active agent consisting of a cationic salt (in reservoir 25), and an inactive salt solution adapted to bring earth formations to a standard resistivity (stored in reservoir 27). The inactive salt solution may be a solution of sodium chloride of other electrolyte. Reservoir 27 is housed within reservoir 25, and reservoir 25 is exposed to borehole pressure by way of bellows 23 and passageway 24. Thus, reservoir 27 also is exposed to borehole pressure. As is best seen in FIG. 2, reservoir 27 is hydraulically coupled to the interior of caisson 100 through a constriction 93, a normally closed, electrically actuated valve 95, suitable intermediate conduits 99 (FIG. 3), and an injection nozzle 220 between conduit 99 and the interior of the caisson. Nozzle 220 may extend almost to the open end of the caisson so that fluid therefrom will be injected directly against the earth formations. Valve 95 (FIG. 2) is normally closed and is opened by means of electrical signals from the earth's surface.

Similarly, chamber 25 is hydraulically coupled to the interior of caisson 100 through a normally closed, electrically actuated valve 97, conduit 101 (FIG. 3), and a nozzle 222. Nozzle 222, like nozzle 220, preferably extends through the caisson to the open end thereof so that fluid passing through the nozzle will be sprayed directly against the earth formation.

It should be noted that reservoirs 25 and 27 should be positioned above caisson 100 so that fluid will readily flow from the reservoirs to the caisson.

Deformable shoe or pad is rammed against the filter cake by apparatus including back-up plate 29 (FIG. 2), pistons 107, 119, 129, and 135 within chambers 113, 121, 131, and 137, respectively. Tension springs 112, 114, 125, and 138 normally pull back-up plate 29 and deformable pad 31 away from the wall of the borehole. When pressurized fluid is injected into chambers 113, 121, 131, and 137, the forces exerted on the piston will force back-up plate 29 and pad 31 into firm engagement with the filter cake lining the borehole. A suitable hydraulic pressure for this purpose is about 4500 pounds per square inch.

The pressure for actuating the pistons 107, 119, 129, and 135 is derived from an electric motor-driven suction pump 13 and a pressure amplifying and reversing apparatus 38. Pressure gauge 53 measures the pressure across pump 13. The inlet of suction pump 13 is connected to several oil-filled hydraulic circuits, and the outlet of the pump discharges into a chamber 15 (FIG. 1). Chamber 15 is hydraulically coupled to a bellows 19 exposed to borehole pressure. Thus, suction pump 13 discharges into a fluid medium exposed to borehole pressure.

Pressure amplifying and reversing means 38 (FIG. 2) includes a piston cylinder 39, the open end of which works against the oil in chamber 15 (and thus against borehole pressure), a smaller piston cylinder 47, and a pair of pistons 41 and 45 coupled together by connecting rod 43.

The inlet 54 of suction pump 13 is coupled to the space between pistons 41 and 45 through conduit system 51, electrically actuated valve 61, conduit 62, and port 64. The differential pressure produced by suction pump 13 will be transmitted to the space between the pistons 41 and 45 and will appear as a differential pressure across piston 41. Piston 45 works against oil that fills the lower end of cylinder 47, conduit 49, 115, 123, and 133, and piston cylinders 113, 121, 131, and 137. The differential pressure across piston 41 will tend to move pistons 41 and 45 downwardly. The differential pressure will be amplified because of the difference in the areas of the faces of pistons 41 and 45. Inasmuch as piston 45 works against a virtually incompressible liquid, the liquid will exert pressure on pistons 107, 119, 129, and 135 to force the pistons outwardly from housing 7 (FIG. 1). Thus, with valve 61 open (FIG. 2), the ultimate effect of suction pump 13 will be to force pistons 107 and 135 to move to the left, as shown, and to force pistons 119 and 127 to move to the right as shown.

Manifestly, should the electrical connection to valve 61 be broken, thereby closing valve 61 while pad 31 and back-up plate 29 are rammed against the filter cake 3, it will be virtually impossible to dislodge instrument housing 7. Therefore, there is provided a fail-safe system including valve 63 (which couples conduit system 51 to conduit system 69 when electromagnetically actuated valve 63 is opened), an electromagnetically actuated valve 65, which, when not actuated, opens conduit system 69 to the interior of chamber 15. Upon actuation of valve 65, fluid communication between conduit system 69 and the interior of chamber 15 is cut off. Conduit system 69 also opens into a chamber 71 within valve 70. Valve stem 79 is moved downwardly against the pressure of coil spring 73 by differential pressure across piston 75. When the valve stem 79 is in its lowermost position, as shown, the lower end of the stem cuts off fluid communication between ports 80 and 77. Port 80 is coupled to port 64 of pressure reversing and amplifying means 38 by conduit 81. Thus, should there be a break in the electrical connection from the surface, valve 65 will open to relieve the differential pressure across piston 75. Valve stem 79 will move upwardly, relieving differential pressure across piston 41 and removing the pressure on pistons 107, 119, 129, and 135 so that tension springs 112, 114, 125, and 138 can retract back-up plate 29 and pad 31.

For the purpose of relieving the pressure in opening or space 109 (FIG. 3), there is provided a rigid-walled mud chamber 37 (FIG. 2) hydraulically coupled to the space 109 by conduit 139, and an oil-filled bellows 35 within chamber 37, coupled to the inlet 54 of suction pump 13 by fluid conduit 85, normally closed electromagnetically actuated valve 59, and conduit system 51. Bellows 35 and conduit 85 are at all times filled with oil. When valve 59 is open, suction pump 13 will draw oil out of bellows 35 to reduce the pressure within chamber 37. Thus, the pressure in space 109 and on the surface of the portion of the filter cake defined by caisson 100 and deformable pad 31 will be substantially lowered. A valve arrangement 83 similar to valve 70 is provided for the purpose of relieving the differential pressure on caisson 100 which may be sufficient to hold pad 31 against the filter cake 3.

A pressure gauge 91 is coupled to the conduit between constriction 93 and valve 95. The purpose of gauge 91 is to measure the volume of the fluid flowing from constriction 93. Since the fluid within fluid reservoir 27 is at substantially the same pressure as the fluid within chamber 25, pressure gauge 91 measures the pressure across constriction 93. The cross-sectional area of constriction 93 is readily determinable so the volume of fluid passing through constriction 93 into caisson 100 can be easily calculated.

Separate electrical leads from the earth's surface may control each of the electromagnetically actuated valves described above, or a suitable remote control system may be utilized for controlling the actuation of the valve with a minimum number of wires in the cable from which the instrument housing is suspended.

The operation of the apparatus described above is as follows. Let it be assumed that instrument housing 7 (FIG. 1) has been lowered into a borehole until rubber pad 31 is adjacent an earth formation on which it is desired to run a test. Electric motor 9 is energized to drive suction pump 13, and the valves 63 and 65 (FIG. 2) are actuated to close valve 65 and open valve 63.

The differential pressure applied across piston 75 will close port 80. Valve 63 now may be closed. Valve 61 may be opened since port 80 is no longer open to fluid communication within port 77. The differential pressure created by suction pump 13 will be applied across piston 41, and the resulting pressure produced by the attempted downward movement of piston 45 will force backup plate 29 and pad 31 outwardly against the filter cake lining the wall of the borehole. The interior of caisson 100 now will be isolated from borehole fluids.

At the same time that valve 70 is actuated by opening valve 63 and closing valve 65, the piston and stem of valve 83 are moved downwardly so that conduit 85 is no longer open to pressure within chamber 15 through the ports of valve 83. When valve 59 is open, bellows 35 will contract to decrease the pressure within space 109 (FIG. 3) so that earth fluids will flow against the filter cake 3. The filter cake will rupture inwardly and particles of the filter cake and earth formation fluids will flow through space 109, conduit 139, and will be stored in mud chamber 37. Conductivity measuring cell 140 in conduit 139 is adapted to measure the conductivity of fluids flowing through conduit 139. Cell 140 may consist of a pair of insulated electrodes coupled to a potential source through suitable current measuring apparatus. The electrical signals produced by conductivity cell 140 are transmitted to the earth's surface to provide the operators with an indication of the nature of the fluids passing through conduit 139. Valve 95 is now open so that the inactive salt solution will flow into the caisson. When sufficient time has passed for the earth inactive salt solution to substantially displace the connate water in the portion of the earth formation adjacent the caisson, a resistivity measurement is made of the resistivity between electrode 204 and caisson 100 through the earth formations. The valve 97 is now actuated so that the reverse wetting cationic salt solution in reservoir 27 can flow to displace the inactive fluid previously injected into the earth formations. The change in the electrical resistivity of the earth formations through which electrical currents pass in flowing from the caisson to electrode 204 is noted on the Wheatstone bridge 222 after the inactive salt solution has been injected and also after the reverse wetting, cationic salt solution has been injected into the earth formations. It is to be noted that electrical currents will not flow directly between the electrode 204 and the caisson 100, but will follow a multiplicity of generally arcuate paths, as shown in FIG. 3. Pad 31 and back-up plate 29 may now be retracted either by de-energizing the actuating coil of valve 65 or by energizing the actuating coils of valves 61 and 57. This will remove the pressure on pistons 107, 119, 129, and 135 to retract the pad and back-up plate. The instrument housing now either may be brought to the earth's surface or may be repositioned in the borehole for another measurement.

Although the embodiment disclosed in the preceding specification is preferred, other modifications will be apparent to those skilled in the art which do not depart from the broadest aspects of the scope of the invention.

What is claimed is:

1. Well logging apparatus, comprising: an electrically conductive caisson having one open end; a sealing pad affixed to said caisson around said open end adapted to isolate the interior of the caisson from fluids within a borehole when said pad is placed against the side of the borehole; an electrode member comprising a body member of electrically nonconductive material extending through and centrally positioned within said caisson adapted for reciprocating movement within said caisson so that one end thereof will move in and out of said open end, and a metallic, electrically conductive member on one end of said body member for contacting earth formations when said one end of said body member extends through said open end of said caisson; electrical measuring means connected to said caisson and to said metallic member for measuring the electrical resistivity therebetween; pump means hydraulically coupled to the interior of said caisson adapted to lower the pressure within said caisson relative to hydraulic pressure within earth formations adjacent said caisson; a first reservoir containing an inactive fluid adapted to bring earth formations to a standard resistivity without changing capillary pressure therewithin when said inactive fluid is injected into the earth formations; a second reservoir containing a cationic salt solution adapted to render preferentially oil wet the earth formations contacted thereby; first coupling means hydraulically coupling said first reservoir to the interior of said caisson; second coupling means hydraulically coupling said second reservoir to the interior of said caisson; and first and second electrically actuated valve means respectively positioned in said first and second coupling means adapted to selectively gate the flow of fluids through said first and second coupling means responsive to electrical signals coupled to said electrically actuated valve means.

2. Well logging apparatus, comprising: an electrically conductive caisson having one open end; a sealing pad affixed to said caisson around said open end adapted to isolate the interior of the caisson from fluids within a borehole when said pad is placed against the side of the borehole; an electrode member comprising a body member of electrically nonconductive material extending through and centrally positioned within said caisson adapted for reciprocating movement within said caisson so that one end thereof will move in and out of said open end, and a metallic, electrically conductive member on one end of said body member for contacting earth formations when said one end of said body member extends through said open end of said caisson; electrical measuring means connected to said caisson and to said metallic member for measuring the electrical resistivity therebetween; pump means hydraulically coupled to the interior of said caisson adapted to lower the pressure within said caisson relative to hydraulic pressure within earth formations adjacent said caisson; a reservoir containing a cationic salt solution adapted to render preferentially oil wet the earth formations contacted thereby; electrically actuated means hydraulically coupling said reservoir to the interior of said caisson adapted, when actuated, to permit fluid flow from said reservoir to said caisson; and electrical means for actuating said electrically actuated means.

3. Well logging apparatus, comprising: an electrically conductive caisson having one open end; a sealing pad affixed to said caisson around said open end adapted to isolate the interior of the caisson from fluids within a borehole when said pad is placed against the side of the borehole; an electrode holder comprising a body member of electrically nonconductive material having enlarged end portions connecting together an intermediate portion of reduced diameter; an opening in said caisson opposite said open end through which said intermediate portion of said electrode holder extends; sealing means between said caisson and said intermediate portion adapted to seal the interior of the caisson and permit bilateral movement of said electrode holder through said opening; spring means positioned between said caisson and the enlarged end portion of said electrode holder outside of said caisson adapted to retract into said caisson the enlarged end portion within said caisson, and to permit movement of said electrode holder out of said caisson through said open end when the pressure within said caisson is less than pressure of borehole fluids on said caisson; a metallic electrode on the enlarged end portion of said electrode holder within said caisson; an electrical connector extending through said electrode holder from the enlarged end of said holder outside of said caisson; electrical measuring means connected to said electrical connector and to said electrically conductive caisson for measuring the electrical resistivity therebetween; pump means hydraulically coupled to the interior of said caisson adapted to lower the pressure within said caisson relative to hydraulic pressure within earth formations adjacent said caisson; a first reservoir containing an inactive fluid adapted to bring earth formations to a standard resistivity without changing capillary pressure therewithin when said inactive fluid is injected therein; a second reservoir containing a cationic salt solution adapted to render preferentially oil wet the earth formations contacted thereby; first coupling means hydraulically coupling said first reservoir to the interior of said caisson; second coupling means hydraulically coupling said second reservoir to the interior of said caisson; first and second electrically actuated valve means respectively in said first and second coupling means adapted to selectively gate the flow of fluids through said first and second coupling means responsive to electrical signals coupled to said electrically actuated valve means.

4. Well logging apparatus, comprising: an electrically conductive caisson having one open end; a sealing pad affixed to said caisson around said open end adapted to isolate the interior of the caisson from fluids within a borehole when said pad is placed against the side of the borehole; an electrode holder comprising a body member of electrically nonconductive material having enlarged end portions connecting together an intermediate portion of reduced diameter; an opening in said caisson opposite said open end through which said intermediate portion of said electrode holder extends; sealing means between said caisson and said intermediate portion adapted to seal the interior of the caisson and permit bilateral movement of said electrode holder through said opening; spring means positioned between said caisson and the enlarged end portion of said electrode holder adapted to retract into said caisson the enlarged end portion within said caisson, and to permit movement of said electrode holder out of said caisson through said open end when the pressure within said caisson is less than pressure of borehole fluids on said caisson; a metallic electrode on the enlarged end portion of said electrode holder within said caisson; an electrical connector extending through said electrode holder from the enlarged end of said holder outside of said caisson; electrical measuring means connected to said electrical connector and to said electrically conductive caisson for measuring the electrical resistivity therebetween; pump means hydraulically coupled to the interior of said caisson adapted to lower the pressure within said caisson relative to hydraulic pressure within earth formations adjacent said caisson; a reservoir containing a cationic salt solution adapted to render preferentially oil wet the earth formations contacted thereby; electrically actuated means hydraulically coupling said reservoir to the interior of said caisson adapted, when actuated, to permit fluid flow from said reservoir to said caisson; and electrical means for actuating said electrically actuated means.

References Cited in the file of this patent
UNITED STATES PATENTS

| | | |
|---|---|---|
| 2,708,155 | Buckley et al. | May 10, 1955 |
| 2,725,282 | Buckley et al. | Nov. 29, 1955 |
| 2,725,283 | Mounce et al. | Nov. 29, 1955 |
| 2,740,695 | Buckley et al. | Apr. 3, 1956 |
| 2,873,423 | Graham et al. | Feb. 10, 1959 |